(12) United States Patent
Murray (10) Patent No.: US 9,141,814 B1
(45) Date of Patent: Sep. 22, 2015

(54) METHODS AND COMPUTER SYSTEMS WITH PROVISIONS FOR HIGH AVAILABILITY OF CRYPTOGRAPHIC KEYS

(71) Applicant: Zettaset, Inc., Mountain View, CA (US)

(72) Inventor: Eric A. Murray, Los Gatos, CA (US)

(73) Assignee: ZETTASET, Inc., Mountain View, CA (US)

( * ) Notice: Subject to any disclaimer, the term of this patent is extended or adjusted under 35 U.S.C. 154(b) by 0 days.

(21) Appl. No.: 14/294,483

(22) Filed: Jun. 3, 2014

(51) Int. Cl.
*G06F 21/60* (2013.01)
*G06F 21/62* (2013.01)
*G06F 11/20* (2006.01)

(52) U.S. Cl.
CPC .......... *G06F 21/602* (2013.01); *G06F 11/2092* (2013.01); *G06F 21/6218* (2013.01); *G06F 2201/805* (2013.01)

(58) Field of Classification Search
CPC ... H04L 9/0816; H04L 9/0822; H04L 9/0833; H04L 9/0838; H04L 9/0861; H04L 63/08; G06F 21/72; G06F 21/78; G06F 21/6218; G06F 11/2092; G06F 2201/805
USPC ............. 380/277–284, 44; 713/168, 189, 193
See application file for complete search history.

(56) References Cited

U.S. PATENT DOCUMENTS

| | | | | |
|---|---|---|---|---|
| 5,555,309 | A * | 9/1996 | Kruys | 380/280 |
| 6,085,323 | A * | 7/2000 | Shimizu et al. | 713/150 |
| 7,646,872 | B2 * | 1/2010 | Brown et al. | 380/277 |
| 7,801,871 | B2 | 9/2010 | Gosnell | |
| 7,877,603 | B2 | 1/2011 | Goodman et al. | |
| 8,135,134 | B2 * | 3/2012 | Orsini et al. | 380/278 |
| 8,171,307 | B1 | 5/2012 | Chang | |
| 8,218,770 | B2 * | 7/2012 | Arulambalam et al. | 380/277 |
| 8,352,750 | B2 | 1/2013 | Haines et al. | |
| 8,385,551 | B2 | 2/2013 | Pourzandi et al. | |
| 2006/0136735 | A1 | 6/2006 | Plotkin et al. | |
| 2013/0061054 | A1 | 3/2013 | Niccolai | |

OTHER PUBLICATIONS

Baldwin, et al., Providing Secure Services for a Virtual Infrastructure, ACM SIGOPS Operating Systems Review archive, Jan. 2009, pp. 44-51, vol. 43 Issue 1. ACM New York. NY. USA.
Harnik, et al., Secure Access Mechanism for Cloud Storage, Scalable Computing, Practice and Experience, 2011, pp. 317-336, vol. 12, No. 3, www.acpe.org.
Microsoft, Configuring Distributed Key Management in VMM, http://technet.microsoft.com/en-us/library/gg697604, aspx, Oct. 17, 2013, pp. 1-3, USA.
Safenet, SafeNet KeySecure, Safenet KeySeoure Product Brief, 2013, pp. 1-4, www.safenet-inc.com, USA.

* cited by examiner

*Primary Examiner* — Hosuk Song
(74) *Attorney, Agent, or Firm* — Marek Alboszta (57) ABSTRACT

Computer systems and methods ensuring high availability of cryptographic keys using a shared file system. The keys are encrypted with at least one shareable master key to generate corresponding encrypted cryptographic keys, which are stored in a key database in the shared file system. A master key manager with access to the key database is elected from among master key manager candidates and is assigned a common virtual address. All master key manager candidates have the shareable master key such that during a failover event the availability of the encrypted cryptographic keys is not interrupted as a new master key manager takes over the common virtual address from the previous master key manager. Additionally, a message authentication code (MAC) is deployed for testing the integrity of keys during their retrieval.

9 Claims, 7 Drawing Sheets

METHODS AND COMPUTER SYSTEMS WITH PROVISIONS FOR HIGH AVAILABILITY OF CRYPTOGRAPHIC KEYS

FIELD OF THE INVENTION

This invention relates to methods and computer systems including those deployed in computer clusters, with provisions and key databases operated in the context of a shared file system to ensure high availability of cryptographic keys.

BACKGROUND ART

Computing systems are becoming more highly distributed and they are required to support many users, each operating one or more client devices. Some of these systems are centered about computer clusters whose machines or nodes execute client requests and serve the desired files. A large number of client devices ranging from smart phones to computers are usually connected to such systems at all times. The users of these devices have come to expect high availability of supported services.

At the same time, growth in the number client devices is putting pressure on security of individual services. In particular, the focus is on the handling of cryptographic keys that are used for file encryption and decryption in such computing systems. The management of these keys has to ensure both their high availability and security. Needless to say, satisfying both requirements at the same time is a challenge.

Most modern computer systems deploy a key manager for storing and handling of cryptographic keys. The key manager, in conjunction with other authentication and authorization functions, determines which parties or clients are authorized to retrieve any particular key. For added safety, several secure key managers are usually deployed together under some type of failover scheme. In other words, there is an agreed-upon process that dictates how the secure key managers act in the event that one or more of them fail.

In some systems, the secure key managers are synchronized and use time-outs when a client happens to be connected to a failing key manager. This means that the client has to wait until after the time-out to be connected to an active key manager, thus negating the requirement of high availability. Furthermore, all key managers have to be synchronized in order to ensure proper operation.

SafeNet's Key Secure is an example of a system with a number of key servers and it is described in the SafeNet KeySecure Product Brief, Feb. 22, 2013, pp. 1-4. This system works well when all key servers are operational and updated, but presents synchronization problems and operation blockage when one of them is down. Thus, a user may have to wait a potentially long time before the system is able to fulfill their key request. A key server may be unavailable when a key operation is performed, require synchronization and possible manual intervention.

Another approach is taken in the Virtual Machine Manager of Microsoft as described in pre-release documents entitled "Configuring Distributed Key Management in VMM", Oct. 17, 2013, pp. 1-3. This approach uses a multi-master system with a loose criterion for convergence of their replicas when the system reaches steady state. At any particular instant in time, the replicas are not guaranteed to be consistent with each other. That is because in the multi-master paradigm changes can be applied to any replica at any time. When any particular master makes an update, it uses the time stamps of changes in the replication messages to determine whether it should update or discard the replication message. Due to finite response time of such systems, certain corner cases may force failure modes due to key conflict.

Another approach to encryption and key managers is taught in U.S. Pat. No. 7,877,603 to Goodman et al. This system relates to a storage drive that communicates with encryption and key managers. It is useful in the context of encrypting removable media but not extendable to distributed computing environments. Another useful teaching related to a key manager that tracks which assets are encrypted with which keys in the context of a data archiving system is found in U.S. Pat. No. 7,801,871 to Gosnell.

Finally, U.S. Pat. No. 8,385,551 to Pourzandi et al. teaches a highly available cryptographic key storage that deploys a classic active/passive failover model. This approach is better adapted to a highly available computer system but still suffers from a number of shortcomings. One of the main ones is the assumption made during key creation that backup nodes of the system are up. When this assumption does not hold, then the key creation operation blocks.

Thus, although a considerable amount of work has been devoted to devising appropriate computer systems and methods for highly available and secure key management, many challenges remain. In particular, it would be an advance in the art to further increase cryptographic key security in such computer systems while compromising little or not at all on the high availability aspect.

OBJECTS AND ADVANTAGES OF THE INVENTION

In view of the shortcomings of the prior art, it is an object of the invention to provide for computer systems and methods that use key managers in a manner that increases cryptographic key security while ensuring high availability of these keys. More precisely, it is an object of the invention to leverage a shared file system with a key database as well as appropriate key integrity testing techniques to avoid real-time key distribution and synchronization between different machines.

It is another object of the invention to provide for computer systems and methods that are highly secure and provide for a safe failover between master key managers that are in charge of handling the cryptographic keys and access to the key database.

These and many other objects and advantages of the invention will become apparent from the ensuing description.

SUMMARY OF THE INVENTION

A number of objects and advantages of the invention are achieved by methods and computer systems that ensure high availability of cryptographic keys in a computer system that operates a shared file system. The computer system can be implemented in a computer cluster that has a number of nodes that serve the shared file system to clients. According to the invention, the cryptographic keys are encrypted with at least one shareable master key to generate corresponding encrypted cryptographic keys. The encrypted cryptographic keys are stored in a key database belonging to the shared file system. A master key manager is elected from among master key manager candidates that belong to the nodes of the cluster. Of course, many master key manager candidates should be available at any time, but there should be at least two master manager candidates to permit such election to take place. The master key manager thus elected from among the candidates is assigned a common virtual address.

The invention further calls for issuing the at least one shareable master key to the master key manager and to each of the master key manager candidates. By making this provision, a failover event does not cause interruption in the availability of the encrypted cryptographic keys. More precisely, upon a failover event the common virtual address is transferred from the master key manager to a new master key manager elected from among the at least one master key manager candidate available to assume the role of master key manager.

Furthermore, a master message authentication code key or master MAC key is issued to the master key manager. The master MAC key is also issued to the master key manager candidates. The master MAC key is applied over each of the encrypted cryptographic keys to generate corresponding message authentication tags. The tags are used to test or confirm the integrity of the encrypted cryptographic keys to which they correspond.

Integrity is typically tested when encrypted cryptographic keys are retrieved for any given purpose, e.g., upon a client request, from the key database. Thus, the message authentication tags are preferably stored along with the encrypted cryptographic keys for which they were generated in the key database. In a preferred embodiment, the key metadata of each of the encrypted cryptographic keys is also included in the MAC process. In other words, the master MAC algorithm is applied over each encrypted cryptographic key along with its metadata to generate joint message authentication tags. This provision is deployed to prevent unauthorized modification of keys or their metadata. It also prevents attachment of unauthorized metadata to encrypted cryptographic keys during a security breach.

In a typical implementation, it is a hardware security module (HSM) that belongs to the master key manager that produces the shareable master key. The shareable master key is also stored in the same HSM. The one or more master key manager candidates are equipped with their own HSMs and the shareable master key is stored in those.

The shareable master key, upon being generated in the HSM of the master key manager is distributed to HSMs of master key manager candidates in a secure manner. For example, a wrapped key exchange protocol or other secure exchange provisions including mutually authenticated and secure communication lines between the master key manager and the one or more master key manager candidates are deployed. It is preferable that master MAC keys also be securely distributed and stored in HSMs of the master key manager and of the one or more master key manager candidates.

During operation, a requestor, e.g., an external client or an internal node or any authorized resource, may request a new cryptographic key. In some cases, the requestor may submit a new cryptographic key to the master key manager. Alternatively, upon the requestor's order, the new cryptographic key can be generated by the master key manager. This step may be performed by the HSM, for example.

In accordance with the invention, the new cryptographic key is encrypted with the shareable master key. This action produces a new encrypted cryptographic key, which is then stored in the key database. Of course, it is preferable that the new encrypted cryptographic key be treated in the same manner as the other encrypted cryptographic keys. This means that it, along with its key metadata, is MACed with the master MAC key to generate corresponding message authentication tag for subsequent confirmation of integrity.

The shared file system can be any type of system, although deployment in distributed file systems may be most advantageous. Among other, suitable distributed file systems include: Hadoop Distributed File System (HDFS), NFS, SMB, DRBD, XtremeFS, legato, Veritas, GFS, Fusion, GPFS, Ceph, Coda, Solaris ZFS. In many of these applications, the encrypted cryptographic keys will pertain to corresponding file units stored in the distributed file system. It is thus convenient to also store in the key database file metadata pertaining to the file units. The file units themselves can be embodied by blocks in storage resources belonging to the computer system (e.g., block storage resources belonging to the cluster in which the computer system is implemented).

The computer system that operates a shared file system that ensures high availability of cryptographic keys, such as the encrypted cryptographic keys derived in accordance with the invention, does not necessarily have to be deployed in a cluster environment. However, many benefits of high availability during failover accrue in the cluster implementation. Specifically, transfer of the common virtual address between nodes of a cluster during failover is well-adapted to transitions between a failed master key manager and a new master key manager elected from among the master key manager candidates. This process not only ensures uninterrupted availability of encrypted cryptographic keys during failover, but it is also similar to the handling of general failover between a master node in charge of the cluster and its backup master node candidates. The latter are elected upon failover in accordance with various well-known strategies (e.g., quorum vote). Therefore, in some embodiments the master key manager and the master key manager candidates are assigned to nodes of the cluster that may in some cases correspond to the cluster's master node and its backup nodes.

In most embodiments, it is a message authentication code module, or MAC module that performs the MACing and integrity confirmation steps. Each member of the set of master key manager candidates designated among the cluster nodes and thus also the present master key manager is equipped with its own MAC module. Thus, any one of them can perform both the MACing and the verification or integrity confirmation on a previously MACed encrypted cryptographic key and its key metadata.

The present invention, including the preferred embodiment, will now be described in detail in the below detailed description with reference to the attached drawing figures.

DETAILED DESCRIPTION

The following description relates to preferred embodiments of the present invention by way of illustration only. Likewise, the figures depict embodiments of the present invention for purposes of illustration only. One skilled in the art will readily recognize from the description and figures that alternative embodiments of the methods and systems illustrated herein may be employed without departing from the principles of the invention described herein.

Figure 1:
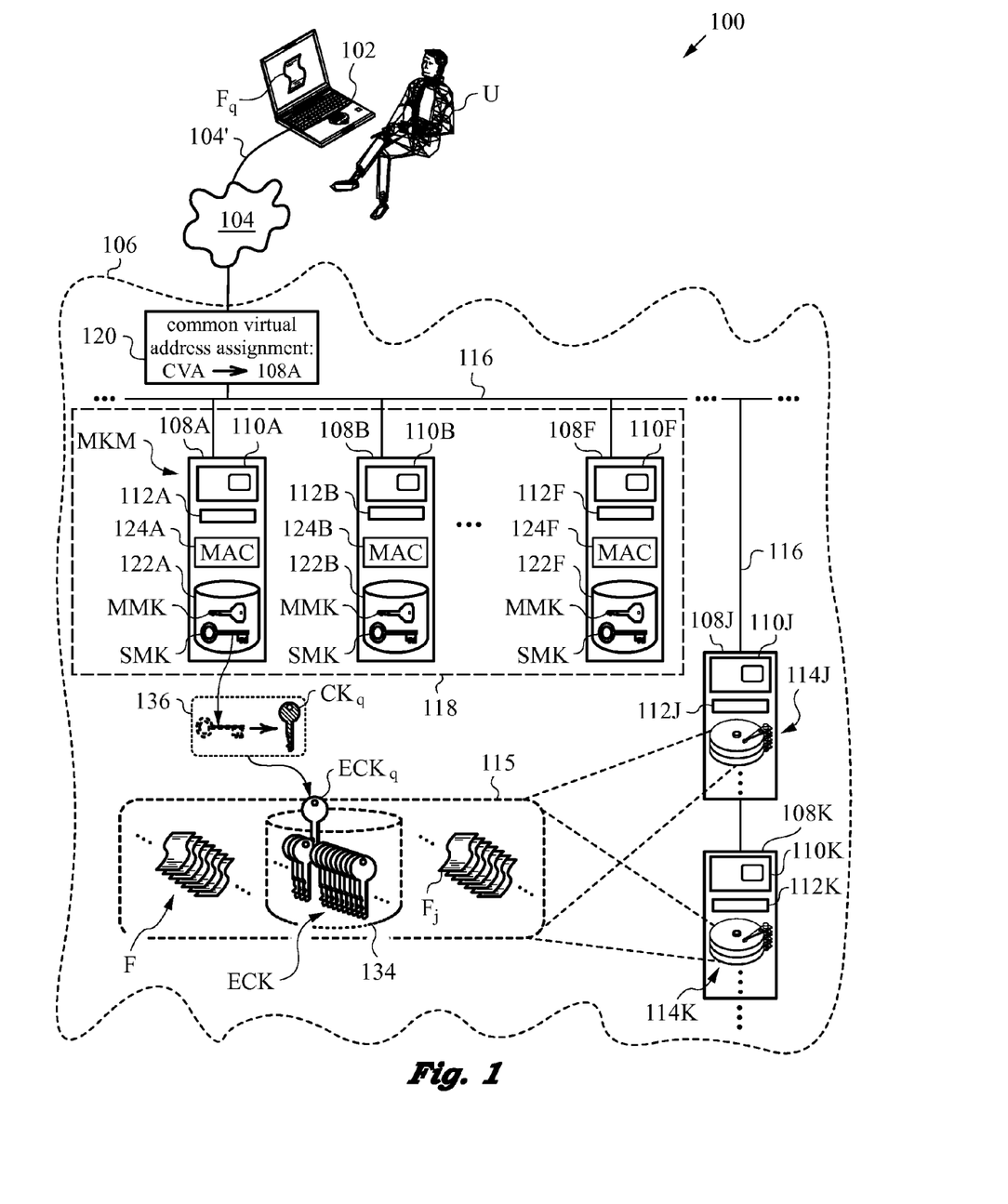
FIG. 1 is a high-level diagram of a computer system according to the invention implemented in a cluster context.

The present invention will be best understood by initially referring to the high-level diagram of FIG. 1. This drawing illustrates the main aspects of a computer system 100 deploying methods that ensure high availability of cryptographic keys in accordance with the invention. Computer system 100 services a user U through his or her client device 102 that will henceforth be simply referred as client 102. User U and client 102 are specifically designated for explanatory purposes. In practical situations a large number of users and client devices or clients, some of which may even belong to the same users, are serviced by computer system 100.

In the present embodiment, client 102 is a mobile computer, and more specifically still a laptop computer. In general, however, client 102 can be any type of device capable of making a network connection and performing any useful function. In most cases, of course, client 102 is a mobile user device such as a mobile phone, a mobile computer, a tablet computer or any thin client device, including devices ranging from electronic watches to sensors with minimal processing capabilities. The latter are sometimes referred to as networked devices making up the Internet of things by those skilled in the art.

User U employs client 102 to connect to computer system 100 over a network connection 104 established over any suitable medium 104'. Connection 104 can deploy any type of wireless or wired medium 104'. In fact, communication network 104 can include a Wide Area Network (WAN) like the Internet, a Metropolitan Area Network (MAN) or a Local Area Network (LAN). The physical connection can be supported by any communications infrastructure including wired, optical and wireless.

In the preferred embodiment, computer system 100 is implemented in a computer cluster 106 encompassed by a dashed line in FIG. 1. Cluster 106 can be geographically collocated or spread out over several physical locations. For reasons of clarity, only the few parts of cluster 106 required to explain the invention are shown explicitly. It will be evident to a skilled artisan, however, that computer cluster 106 can also be implemented on various computer grids and other configurations well known in the art.

Cluster 106 has a number of machines or computers typically referred to as nodes by those skilled in the art. Of all such nodes, which may number in the hundreds, thousands or even tens of thousands and more, only five, namely nodes 108A, 108B, 108F and 108J, 108K are expressly shown. In this example, all five drawn nodes 108A, 108B, 108F, 108J, 108K are provisioned with similar computing or processing resources 110A, 110B, 110F, 110J, 110K. These include central processing units (CPUs), graphical processing units (GPUs) and any generally acceptable dedicated or generic processors and support resources.

First three visible nodes 108A, 108B, 108F are also provisioned with any suitable type of storage resources and any other node support resources generally indicated by references 112A, 112B, 112F. For example, resources 112A, 112B, 112F are embodied by any local storage hardware capable of storing files. More generally, resources 112A, 112B, 112F can include printers, monitors, application-specific processors, block storage devices including hard drive devices (e.g., parallel or serial, such as SATA), flash drives and any other cluster resources. In fact, any physical or logical component that can be brought on-line and off-line, managed in cluster 106 and hosted by just one of nodes 108A, 108B, 108F can be represented among the set of resources 112A, 112B, 112F. It should be also noted that nodes 108A, 108B, 108F can each be provisioned with the same or different resources. A person skilled in the art will recognize that any workable allocation of resources and node topology is permissible.

Meanwhile, nodes 108J, 108K are also provisioned with suitable resources 112J, 112K that may be analogous or different from those found in nodes 108A, 108B, 108F. In addition, nodes 108J, 108K are equipped with specific storage resources 114J, 114K here embodied by hard disk drive arrays that can efficiently store and serve a large number of files F. In fact, storage resources 114J, 114K support an entire shared file system 115 that contains files F. One specific file, namely the j-th file $F_j$ is called out from among files F for later explanatory purposes.

In the present embodiment, shared file system 115 is clearly also a distributed file system. As shown, it is served from storage resources 114J, 114K of two separate nodes, namely nodes 108J, 108K. In practice, many of the nodes omitted in FIG. 1 are also engaged in serving up file system 115 and thus file system 115 is distributed over many nodes of cluster 106 besides representative nodes 108J, 108K.

Shared file system 115 can be any type of distributed file system whose operation can be supported and managed in cluster 106. For example, distributed file system 115 can be any one of the following: Hadoop Distributed File System (HDFS), NFS, SMB, DRBD, XtremeFS, legato, Veritas, GFS, Fusion, GPFS, Ceph, Coda, Solaris ZFS. A person skilled in the art will be able to discern that still other systems can be deployed in the present invention upon any requisite modifications based on the subsequent teachings.

All nodes of cluster 106, including nodes 108A, 108B, 108F and 108J, 108K are interconnected by a corresponding network of interconnections 116. In many situations, interconnections 116 are embodied by a local area network (LAN) and include any special connections, such as heartbeat lines, etc. Furthermore, when cluster 106 is geographically spread out, interconnections 116 include the requisite intra- and inter-cluster communication fabric including any requisite wide area network lines (WAN) or dedicated pipes.

In accordance with the invention, nodes 108A, 108B, 108F and omitted nodes between nodes 108B and 108F indicated by the ellipsis are all members of a set 118 of master key manager candidates. Set 118 of master key manager candidates 108A, 108B, . . . , 108F is preferably much larger than the minimum number of two such candidates. With just two master key manager candidates in set 108, when one is elected to serve as master key manager only one is available to assume the role of master key manager during failover. A person skilled in the art will recognize that this situation is reminiscent of failover between a master node in charge of entire cluster 106 and one of its backup master nodes. In high availability clusters such situation is not desirable and thus more backup master nodes are always on stand-by. The situation with master key managers is similar. Consequently, it is preferred that set 118 contain at least three or still more master key manger candidates, just as in the case of backup master nodes.

In the example shown in FIG. 1, first node 108A of set 118 has already been elected as master key manager MKM and is correspondingly designated. The election itself was performed by any well-known technique. For example, any of the techniques deployed for election of a master node (not shown) of cluster 106 can be deployed in electing master key manager MKM. These include election by quorum of candidates in set 118 or by other voting procedures known to those skilled in the art. It should be noted, that node 108A that is now master key manger MKM is typically not the same node as the one elected to be the master of entire cluster 106. However, in some embodiments it is possible to assign the duties of managing cluster 106 as well as being master key manager MKM to the same node.

Computer system 100 uses a virtual address assignment module 120 to keep track of the assignment of master key manager MKM. In particular, master key manager MKM elected from among candidates of set 118 is assigned a common virtual address CVA by module 120. In the present case, while first node 108A is performing its duties as master key manager MKM, it is assigned common virtual address CVA by module 120. A person skilled in the art will recognize that module 120 can be implemented on any node in cluster 106 or in a separate unit, as depicted in FIG. 1. In either case, it is important that client 102 or any requestor of cryptographic keys first obtain from module 120 common virtual address CVA assigned to current master key manager MKM.

Each one of nodes 108A, 108B, . . . , 108F in set 118 of master key manager candidates is provisioned with a hardware security module (HSM). Node 108A serving as current master key manager MKM is equipped with hardware security module 122A that is herein referred to as primary hardware security module or just primary HSM for short. Meanwhile, nodes 108B, . . . , 108F are equipped with hardware security modules 122B, . . . , 122F that are henceforth referred to as secondary hardware security modules or secondary HSMs. Of course, only secondary HSMs 122B and 122F are expressly shown in FIG. 1. As is known in the art, hardware security modules HSMs are typically responsible for generating and storing cryptographic keys in a secure manner.

Each one of nodes 108A, 108B, . . . , 108F in set 118 of master key manager candidates is further equipped with a message authentication code module 124A, 124B, . . . , 124F or MAC module for short. MAC modules 124A, 124B, . . . , 124F are designed to authenticate or verify the integrity of messages, files, keys or other digital entities in accordance with any known verification technique that may include hashing or keying of the digital entities that are to be checked for integrity. In the present embodiment, MAC modules 124A, 124B, . . . , 124F are of the type that deploy master message authentication code key MMK or master MAC key for short to carry out their integrity tests.

Master MAC key MMK is generated and stored in primary HSM 122A. Thus, master MAC key MMK is issued to acting master key manager MKM. As it is common to devolve the duties of key creation and safekeeping to HSMs, this approach is preferred. However, in alternative embodiments, MAC module 124A of acting master key manager MKM can be tasked with generating and safeguarding master MAC key MMK.

According to the invention, primary HSM 122A is also entrusted with generating and storing a shareable master key SMK. Thus, in preparation for serving its duties, master key manager MKM is issued both shareable master key SMK and master MAC key MMK. Both keys SMK, MMK are illustrated after their generation and already stored in primary HSM 122A.

Figure 2:
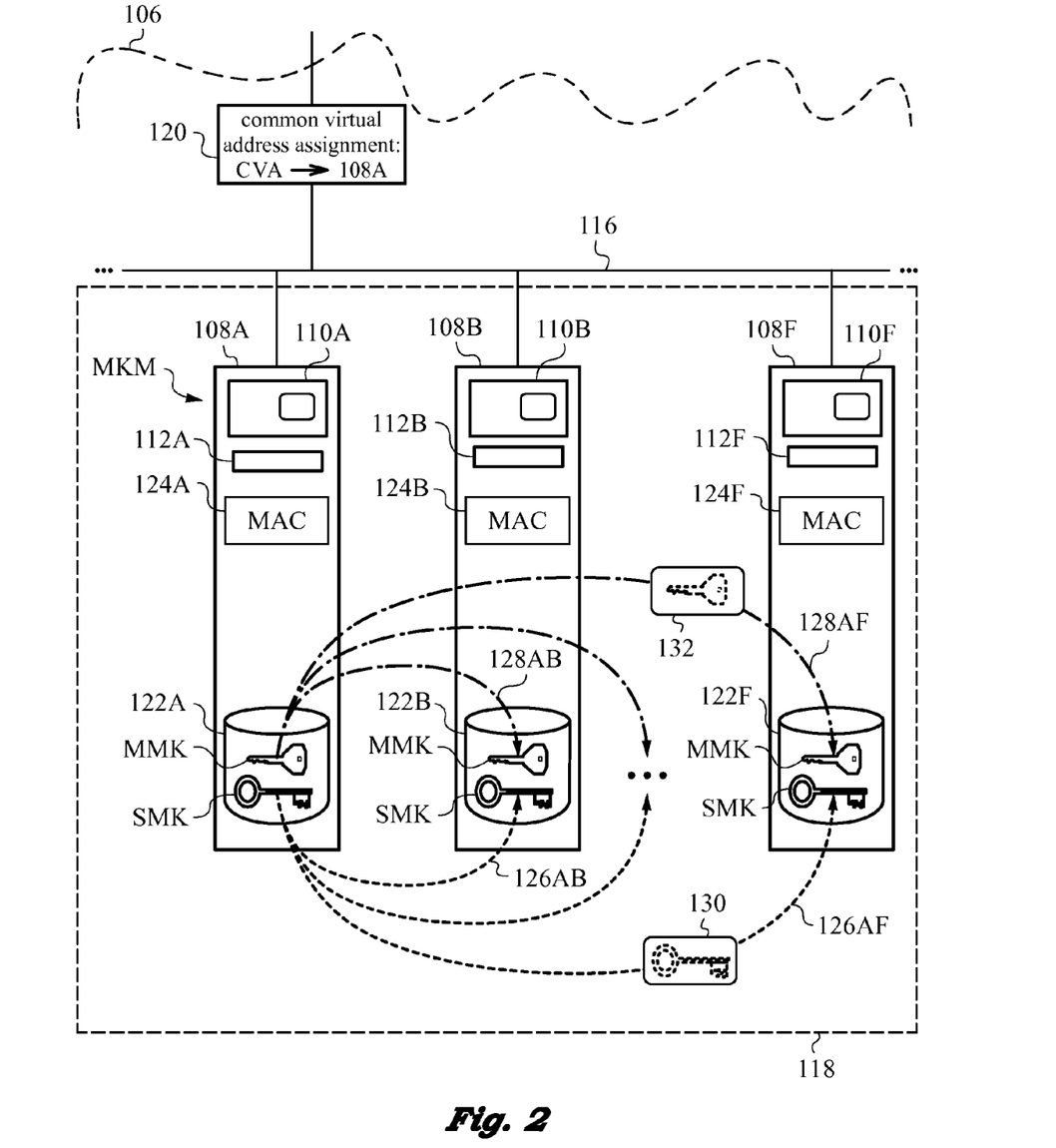
FIG. 2 is a diagram illustrating the distribution of shareable master key (SMK) and master message authentication code key (master MAC key) from master key manager to members of the set of master key manager candidates in the computer system of FIG. 1.

Nodes 108A, 108B, . . . , 108F in set 118 of master key manager candidates also have to be issued shareable master key SMK and master MAC key MMK in preparation for fulfilling their duties. FIG. 2 is a more detailed diagram that clarifies this step. Specifically, keys MMK, SMK are transmitted from primary HSM 122A of master key manager MKM where they were generated to secondary HSMs 122B, . . . , 122F of all members of set 118. Transmission of SMK key for storage in HSMs 122B, . . . , 122F is indicated by dashed arrows 126AB, . . . , 126AF. Transmission of MMK key for storage in HSMs 122B, . . . , 122F is indicated by dashed and dotted arrows 128AB, . . . , 128AF. As a result of this transmission of keys, each one of master key manager candidates in set 118, i.e., nodes 108B, . . . , 108F in the present example, is issued SMK and MMK keys.

In principle, any manner of transmitting SMK, MMK keys over interconnections 116 between node 108A serving as master key manager MKM and nodes 108B, . . . , 108F of set 118 is permissible. What is important, however, is to convey them between primary HSM 122A and secondary HSMs 122B, . . . , 122F in a secure manner. For this last reason, it is preferred that transmission of SMK, MMK keys as indicated by arrows 126AB, . . . , 126AF and arrows 128AB, . . . , 128AF take place over mutually authenticated and secure connections between primary and secondary HSMs 122A, 122B, . . . , 122F. The negotiation and establishment of such connections is well known to those skilled in the art.

Mutually authenticated and secure connections 126AB, . . . , 126AF and 128AB, . . . , 128AF between MKM and the remaining members of set 118 can be supplemented with additional safeguards. For example, in the preferred embodiment, a wrapped key exchange protocol is deployed to further increase security of key transmission. SMK key is wrapped in a key exchange key 130. MMK key is wrapped in a key exchange key 132. Key exchange keys 130, 132 can comply with any suitable exchange protocol. Such strategies are based on previously negotiated parameters between all nodes 108A, 108B, . . . , 108F that belong to set 118 of master key manager candidates. Suitable processes are well known to those skilled in the art.

We now turn back to FIG. 1 to review the provisions of computer system 100 to ensure high availability of cryptographic keys. First, we note that user U working on a specific file $F_q$ on client 102 requires a corresponding cryptographic key $CK_q$ for securing file $F_q$. For purposes of explanation we presume that only a single cryptographic key $CK_q$ is necessary. In practice, however, depending on system security type, encryption file size and still other parameters, file $F_q$ may actually require several such cryptographic keys. For example, if file $F_q$ is large, it may require a series of cryptographic keys; e.g., one cryptographic key for each block in memory resources occupied by file $F_q$. A person skilled in the art will be able to adapt the present teachings to any specific file encryption strategies.

In accordance with the invention, any cryptographic keys such as cryptographic key $CK_q$ in the example depicted in FIG. 1, is encrypted with shareable master key SMK to generate corresponding encrypted cryptographic key $ECK_q$. Encrypted cryptographic key $ECK_q$ is then stored in a key database 134 belonging to shared and in this case also distributed file system 115. The same is done with other cryptographic keys CK that are requested by any legitimate client of computer system 100, by a cluster resource or by any other legitimate requestor. Key database 134 is used to store encrypted cryptographic keys ECK for all cryptographic keys CK thus requested or even submitted by a client or a resource for encryption with shareable master key SMK to generate corresponding encrypted cryptographic keys ECK.

Note that in the present embodiment distributed file system 115 is also used as repository of user-generated files F. These include file $F_j$ previously created user U and file $F_q$ that is presently being operated on by user U and may be stored in file system 115 when user U is done working on it.

The step of encryption of cryptographic key $CK_q$ with shareable master key SMK is shown taking place within a secure space 136. Space 136 could be hosted by any resource of node 108A that is serving as master key manger MKM. It is most convenient, however, for secure space 136 to be within primary HSM 122A. Further, we note that shareable master key SMK is a symmetric key. Symmetric encryption has the advantage that it is more efficient at processing large amounts of file encryptions and is computationally less intensive than encryption with asymmetric keys.

Figure 3A:
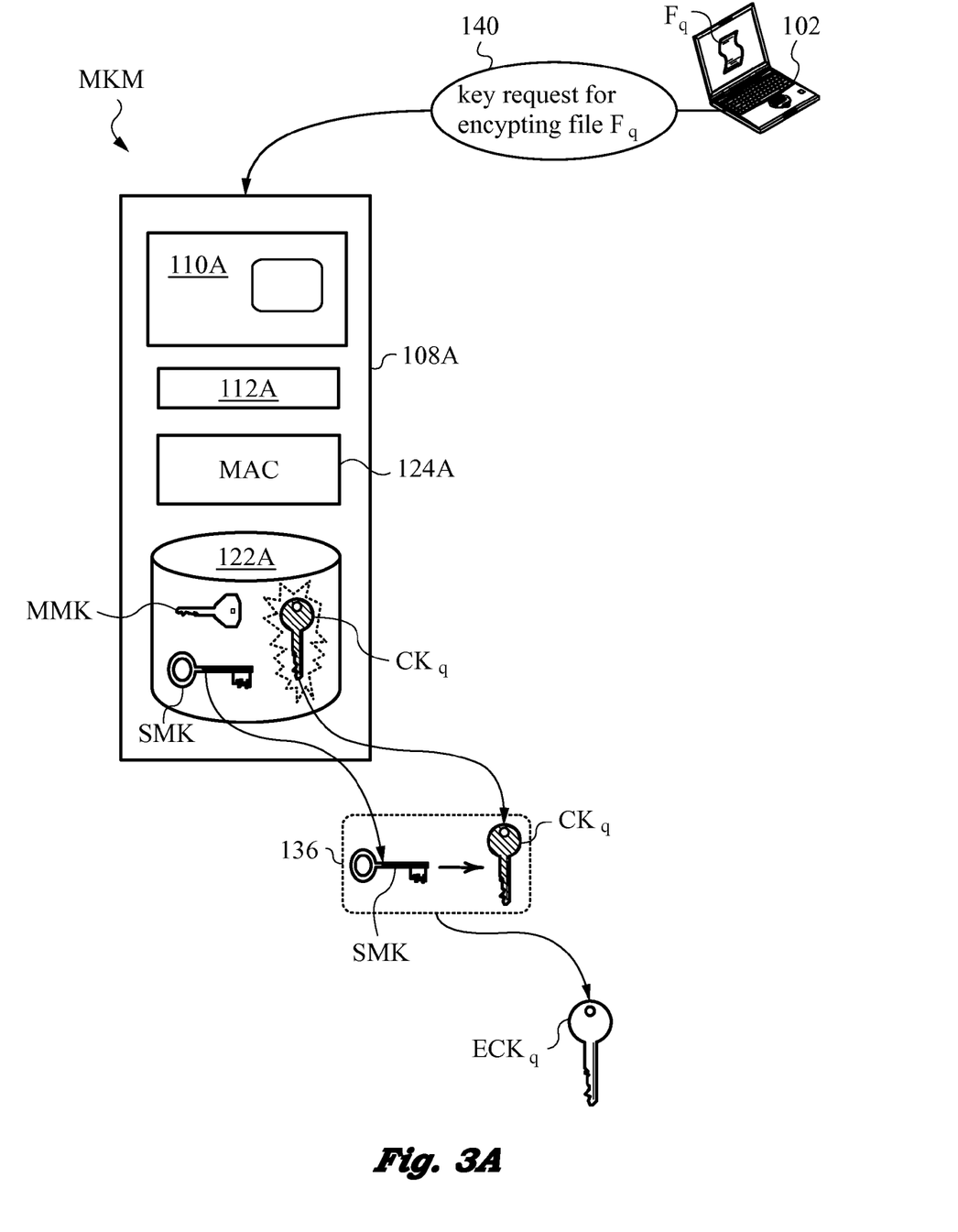
FIG. 3A is a diagram showing the encryption of a cryptographic key with the sharable master key SMK to generate an encrypted cryptographic key ECK.
Figure 3B:
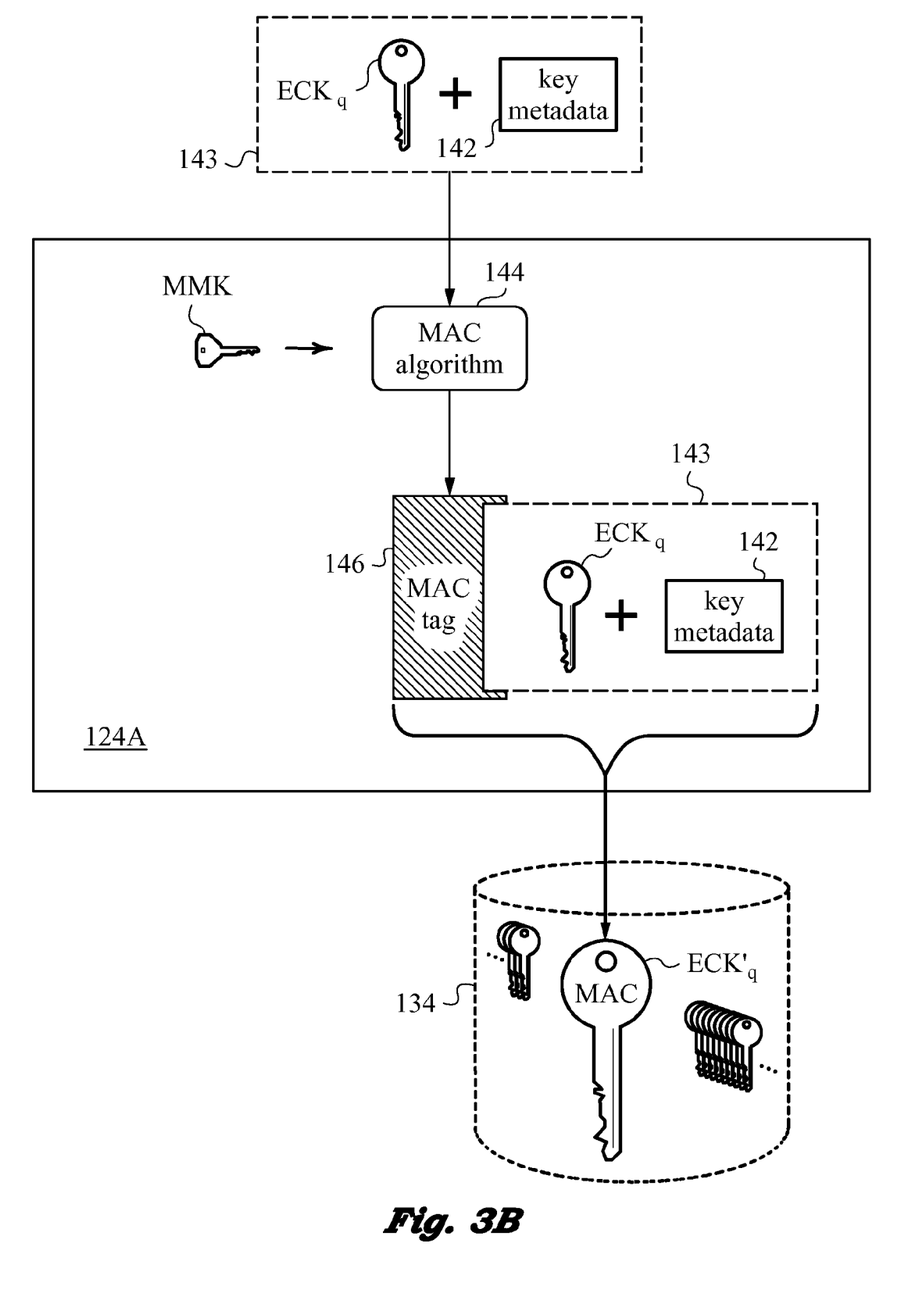
FIG. 3B is a diagram showing the MACing of encrypted cryptographic key ECK prior to its storage in the key database of the shareable file system belonging to the computer system of FIG. 1.

To gain a better understanding of the operation of computer system 100 we now turn to FIGS. 3A-B. FIG. 3A shows the process of encryption of cryptographic key $CK_q$ with sharable master key SMK in more detail. This process commences with client 102 issuing a key request 140 for encrypting file $F_q$. Note that client 102 is appraised that current or acting master key manager MKM is node 108A. That is because module 120 informs client 102 of common virtual address CVA. Meanwhile, node 108A is the one that holds common virtual address CVA. For as long as node 108A does not fail, malfunction or become otherwise unreliable so as to provoke failover to another master key manager selected from set 118, it holds that common virtual address CVA (see FIG. 1).

Using common virtual address CVA, client 102 presents key request 140 to node 108A in its capacity as master key manager MKM. As noted above, it is possible for client 102 acting as requestor to supply its own cryptographic key $CK_q$ to master key manager MKM. In such cases we refer to requestor 102 as a submitter. Acting as submitter, client 102 generates its own cryptographic key $CK_q$ and encrypts file $F_q$ with it. Then, submitter 102 sends cryptographic key $CK_q$ to master key manager MKM without retaining a local copy thereof.

After sending away cryptographic key(s) pertaining to any encrypted file(s) client 102, whether acting as submitter or only as requestor, can only receive keys upon proper client authentication and thus the security risks are contained. In other words, the comparative security risk of a key compromise is no worse if it is client 102 that generates its own cryptographic key(s) instead of relying on master key manager MKM to generate cryptographic key(s) upon key request 140.

As noted above, cryptographic key $CK_q$ can be a per-block key (i.e., it can be designed to unlock and unlock a particular block in memory space). In the present example, cryptographic key $CK_q$ applies to an entire disk partition rather than just a single block in memory space. In other words, cryptographic key $CK_q$ is used to unlock encrypted disk partition(s) where the desired file(s) F, e.g., file $F_q$, are located.

This threat model is particularly useful in cases where an attacker steals client 102 belonging to user U from a data center. Once off the data center's network, the attacker will not be able to obtain cryptographic key $CK_q$ and decrypt the data in the protected partition(s). That is because client 102 will not get access to cryptographic key $CK_q$ that has been sent to master key manager MKM for further encryption and ultimate storage in distributed file system 115. Introduction of such key serving strategy is advantageous in that cryptographic keys are not stored on client machines and thus cannot be taken by an attacker who takes the client machine. Meanwhile, any person skilled in the art will recognize that it is easier to improve the security for a small number of key servers than a large number of client machines.

In embodiments where requestor 102 is not a submitter cryptographic key $CK_q$ still needs to be generated. Thus, in response to key request 140, master key manager MKM instructs primary HSM 122A to generate cryptographic key $CK_q$. Of course, in order to encrypt file $F_q$ that resides on requestor 102, cryptographic key $CK_q$ has to be returned to requestor 102. This step is not explicitly shown in FIG. 3A. Just as in the case of client 102 acting as submitter, requestor 102 retains no local copy of cryptographic key $CK_q$ after it has successfully encrypted file $F_q$ with it.

Once file $F_q$ is encrypted, shareable master key SMK is deployed by master key manager MKM to encrypt cryptographic key $CK_q$. The act of encryption of cryptographic key $CK_q$ yields encrypted cryptographic key $ECK_q$. The act itself takes place in secure space 136, such as within primary HSM 122A. A person skilled in the art will recognize that encrypting a key with another key is commonly referred to as wrapping. Wrapping is a standard procedure in the art of cryptography. The application of the key-wrapping step in the present embodiment yields a wrapped key that is referred to as encrypted cryptographic key $ECK_q$.

FIG. 3B is a diagram illustrating a preferred manner of handling encrypted cryptographic key $ECK_q$ prior to its storage in key database 134 of file system 115. First of all, it is preferable to treat encrypted cryptographic key $ECK_q$ and its correspondent key metadata 142 together or as a data unit 143. In other words, although the methods and systems of invention are applicable to just encrypted cryptographic keys ECK on their own, for reasons of added security it is preferable to extend these methods and systems to include key metadata 142.

Key metadata 142 typically consists of information about encrypted cryptographic key $ECK_q$ and also possibly about its progenitor cryptographic key $CK_q$. In the present embodiment, key metadata 142 contains the following entries: key owner, owner permissions, creation time, expiration time, last used time. Of course, many other relevant data for encrypted cryptographic key $ECK_q$ can be included in key metadata 142 in other embodiments. A person skilled in the art will be familiar with metadata formats for encrypted keys and what specific data entries may be required for any given application.

Once ready, data unit 143 consisting of encrypted cryptographic key $ECK_q$ and its key metadata 142 is passed to a MAC algorithm 144 running in MAC module 124A of acting master key manager MKM (also see FIG. 1). MAC algorithm 144 applies master MAC key MMK over entire unit 143. In other words, MAC algorithm 144 applies master MAC key MMK over both encrypted cryptographic key $ECK_q$ and its key metadata 142 to generate a single or a joint message authentication tag 146 or MAC tag for short. The process of applying master MAC keys over data is well-known in the art and is sometimes also referred to as MACing of data. The output of MACing in the present situation is joint MAC tag 146.

Note that although MAC module 124A is shown as a separate unit, it is common and indeed preferred that MAC module 124A actually reside in HSM 122A along with master MAC key MMK. The secure space set up within HSM 122A (see, e.g., secure space 136 in FIG. 3A) ensures a high security level during the MACing process. This is just as important as protecting shareable master key SMK and ensuring its secure application to cryptographic key $CK_q$ to generate encrypted cryptographic key $ECK_q$.

In embodiments in which only encrypted cryptographic key $ECK_q$ is MACed, MAC tag 146 obviously only protects the integrity of that key. It is thus not a joint MAC tag that protects the integrity of keys and their metadata. Meanwhile, the MACing of both keys and metadata is safer as it automatically builds in a safety cross-check that enables one to detect and thus prevent tampering by attackers that reshuffle keys and their metadata. The same provision also permits one to discover and therefore prevent attachment of unauthorized metadata to encrypted cryptographic keys.

MAC tags for all MACed data units are stored in key database 134 along with data units to which they belong. Thus, in the present case, joint MAC tag 146 is placed along with data unit 143 containing encrypted cryptographic key $ECK_q$ and key metadata 142 among all of the other MACed data units. For simplicity, FIG. 3B designates the combination of joint MAC tag 146 and data unit 143 with encrypted cryptographic key $ECK_q$ by primed reference $ECK'_q$ denoting the composite data and a corresponding "MAC" adnotation.

During normal operation of computer system 100, joint MAC tag 146 is used to test or confirm the integrity of encrypted cryptographic key $ECK_q$ to which it corresponds. The process of verification or confirmation of integrity includes key metadata 142. The corresponding steps are initiated by a request from a requestor. For example, user U may submit a request via client 102 for encrypted cryptographic key $ECK_q$ to access file $F_q$ (see FIG. 3A) after that file has been previously encrypted with cryptographic key $CK_q$ and stored.

Figure 3C:
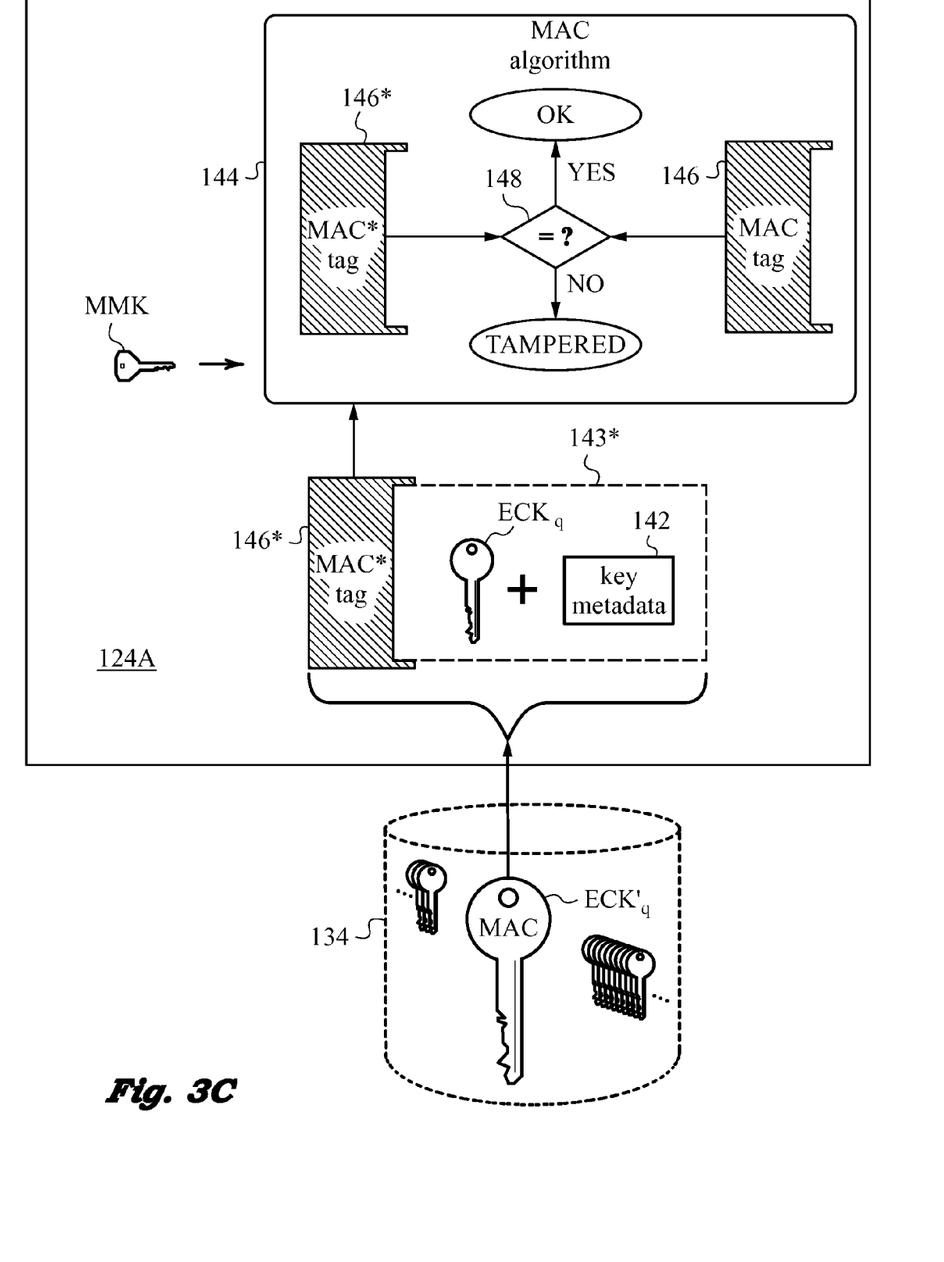
FIG. 3C is a diagram illustrating the steps undertaken during validation or confirmation of integrity of encrypted cryptographic keys upon their retrieval from the key database of the shareable file system of the computer system shown in FIG. 1.

The diagram of FIG. 3C illustrates the steps undertaken upon receipt of a request for encrypted cryptographic key $ECK_q$ in particular. Of course, the same steps are followed when any authorized requestor needs one or more other encrypted cryptographic keys ECK from key database 134. In fact, integrity is tested whenever encrypted cryptographic keys ECK are retrieved for any given purpose.

During the first step, the combination of joint MAC tag 146 and data unit 143 with encrypted cryptographic key $ECK_q$ all referred to as composite data $ECK'_q$ are retrieved from database 134. Since tampering with composite data $ECK'_q$ may have occurred while being stored in database 134, integrity cannot be assumed. Therefore, it is not assumed that joint MAC tag 146 is still the same. Instead, upon retrieval from database 134 the MAC tag is presumed to be different and is therefore referred to as joint MAC tag 146* to be tested.

In the next step, joint MAC tag 146* to be tested is submitted along with the potentially tampered data unit 143* to MAC module 124A. The master MAC key MMK is now deployed by MAC algorithm 144 to compute the value of joint MAC tag 146* to be tested. This step takes place in MAC module 124A that is preferably in primary HSM 122A or in some other secure space for reasons explained above.

During the subsequent step, MAC algorithm 144 is used to calculate joint MAC tag 146 over metadata 142 and encrypted key $ECK_q$. The thus calculated MAC tag 146 is then compared with joint MAC tag 146* from the database. The comparison is carried out in a simple comparator 148 that yields the answer "YES" in the case of equality. Comparator 148 yields "NO" when joint MAC tag 146* to be tested is not equal to the newly calculated MAC value. It should be noted that no specific security measures are taken to protect MAC tag 146. The security of any MAC tag has a much lower priority than the security of keys. That is because the correct MAC tag can only be generated by the holder of master MAC key MMK. In accordance with the invention, the holder of master MAC key MMK can only be a member of set 118 of potential master key manager candidates. All of those are very secure and use their HSMs for keeping master MAC key MMK.

The "NO" answer attests to possible tampering. When confronted with this result, MAC algorithm 144 reports the result "TAMPERED" thus indicating that either encrypted cryptographic key $ECK_q$ or key metadata 142 or both have possibly been tampered with. At this point, neither one can be trusted. Specifically, metadata 142 could now be compromised such that it may grant permissions to an attacker. Meanwhile, an attacker could also mount cryptographic attacks against shared master key SMK by using the modified encrypted cryptographic key. Therefore, neither one should be used again.

An attacker's modification to encrypted cryptographic keys or key metadata effectively renders the affected files F that require cryptographic key $CK_q$ derived from encrypted cryptographic key $ECK_q$ unusable. Differently put, such compromise is tantamount to deletion of affected files F. Given that the number of nodes in set 118 that handle the serving of keys is usually much smaller than the number of data servers in cluster 106, however, these nodes can be secured with relative ease. Furthermore since key database 134 is also relatively small, it can be easily backed up.

An important aspect of the invention is to ensure that computer system 100 and its ability to serve cryptographic keys obtained in the manner described above are not compromised by a failure of master key manager MKM. To better understand the failover event triggered by a failure of master key manager MKM, which in the present example is node 108A, we turn to FIG. 4. Here we focus on just nodes 108A, 108B, . . . , 108F that are members of set 118 of master key manager candidates. The failure of node 108A serving as current master key manager MKM is indicated by a break 150 in one of interconnections 116 that connects node 108A to all other nodes. Of course, connection break 150 is just one mode of failure that can trigger failover. A person skilled in the art will recognize that problems such as intermittency, high error rate and any other issues leading to unreliability are also valid causes for a failover.

Failure of node 108A precipitates the failover event in which a new master key manager MKM is elected from among available master key manager candidates in set 118. As pointed out above, the election process can be analogous to the one used in the election of a master node for managing entire cluster 106. For example, the election is held based on a quorum vote of available master key manager candidates in set 118. In the present case, the available master key manager candidates are nodes 108B through 108F. Of those, node 108B is actually chosen by the election process to be the new master key manager MKM. Failover due to break 150 thus results in node 108B taking over the duties of MKM from node 108A as indicated by arrow 152 in FIG. 4.

Figure 4:
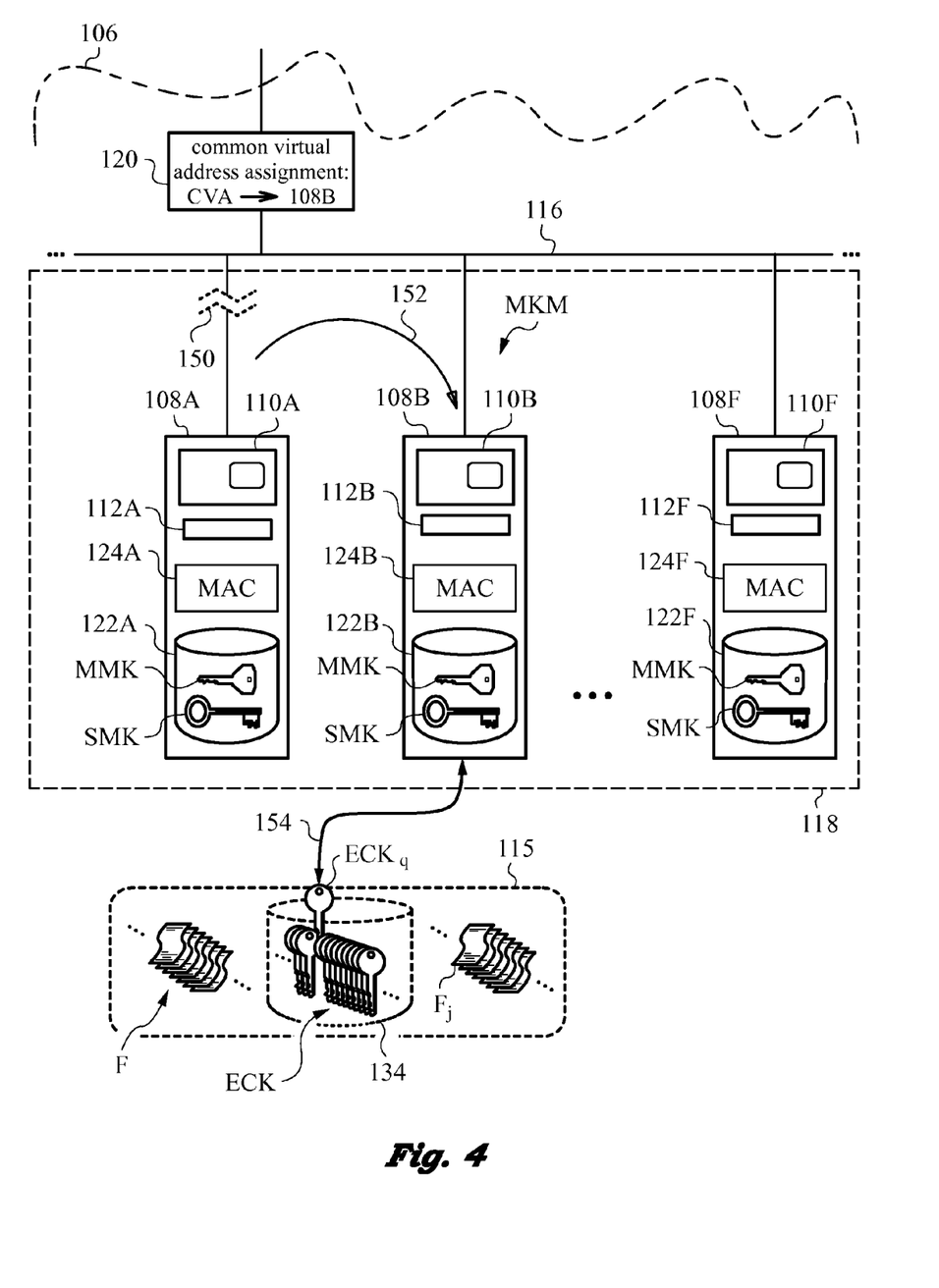
FIG. 4 is a diagram showing the handling of a failover event by the computer system of FIG. 1.

As soon as failover occurs, elected node 108B acting as master key manager MKM grabs common virtual address CVA assigned by virtual address assignment module 120. This new assignment is indicated in FIG. 4. Once again, the skilled artisan will recognize that any method of managing common virtual address CVA is permissible, as long as it promptly reacts to the failover event. In fact, common virtual address CVA can even be implemented based on a simple list of node addresses for all nodes in set 118. The current master key manager MKM can thus be placed at the top of the list and use common virtual address CVA for as long as it correctly fulfills its duties, i.e., until the next failover event. In any event, it is important that client 102 or any requestor of cryptographic keys first obtain from module 120 common virtual address CVA assigned to current master key manager MKM, which is now node 108B.

By equipping all nodes in set 118 with the same capabilities, the failover event does not cause interruption in the availability of encrypted cryptographic keys ECK. For example, any requestor, e.g., an external client or an internal node or any authorized resource, may now request a previously created cryptographic key through node 108B. Such request may be for an already existing cryptographic key encrypting or for a new cryptographic key that is either supplied by the client (client is the submitter) or to be generated in HSM 122B of node 108B (client is a requestor).

In particular, a client may request previously created cryptographic key $CK_q$ that was already converted to encrypted cryptographic key $ECK_q$ in node 108A with the aid of shared master key SMK in accordance with the method described above. Acting as active master key manager MKM, node 108B now accesses key database 134 in file system 115 and pulls encrypted cryptographic key $ECK_q$, as indicated by arrow 154. It then executes above-described steps to verify integrity of key $ECK_q$. If MAC tag 146* shows no evidence of tampering (see FIG. 3C), then node 108B recovers cryptographic key $CK_q$ from key $ECK_q$ by reversing the process of encryption with shared master key SMK. It then sends cryptographic key $CK_q$ to the client. On the other hand, if the client requests or provides a new key, then node 108B executes the same steps as already described above for node 108A.

In many applications encrypted cryptographic keys ECK will pertain to corresponding file units stored in distributed file system 115. In one of the cases, the file units are simply denominated in files F themselves and keys ECK are just per-file keys. In other embodiments, as indicated above, the units can be much larger, e.g., on the order of a memory partition. At the other extreme, small file units such individual memory blocks corresponding to block in block-storage resources can represent the file units. A person skilled in the art will recognize that the granularity of file units will depend on many typical parameters of database and system designs that trade off between security, ease of access, overhead and other well-known performance parameters.

Figure 5:
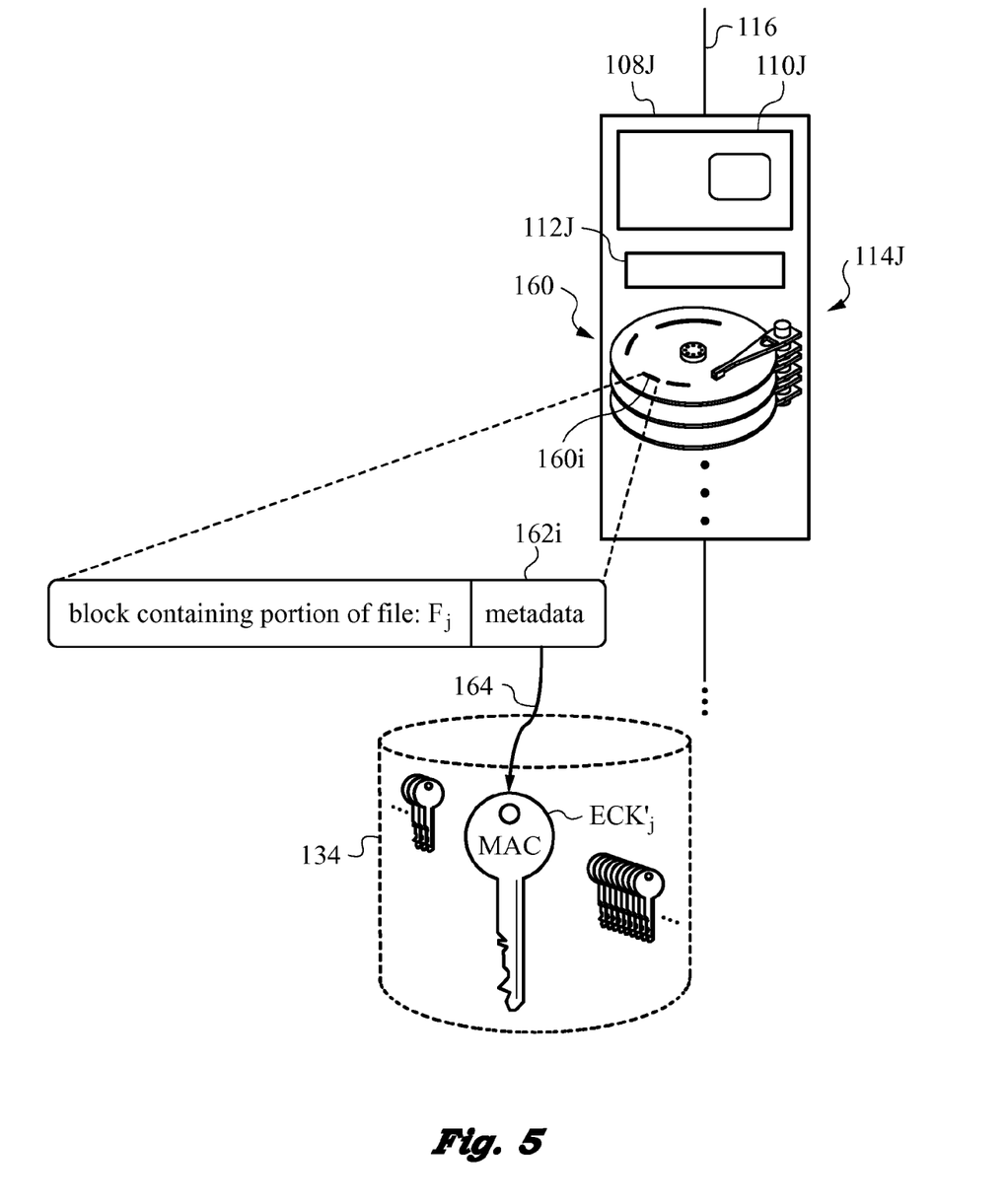
FIG. 5 is a diagram of an embodiment in which files are stored by memory block and metadata pertaining to the file units is stored the key database.

FIG. 5 illustrates an embodiment of computer system 100 where files F are stored based on the memory blocks defined in storage resources 114J of node 108J. In this example, a specific file $F_j$ is stored in a memory block 160$i$ on one of the disks of resources 114J. In other words, the file units in this case are memory blocks 160 in storage resources 114J. we note that file $F_j$ is too large to be stored in single block 160$i$, so its remainder is distributed over other blocks 160. What is important, is that metadata 162$i$ associated with selected file unit here embodied by memory block 160$i$, also be stored in key database 134. This is indicated by arrow 164 in FIG. 5.

Of course, a computer system that operates a shared file system that ensures high availability of cryptographic keys, such as the encrypted cryptographic keys derived in accordance with the invention, does not necessarily have to be deployed in a cluster environment. In other words, a computer system according to the invention may be deployed locally on just a few machines or in a small network. However, many benefits of high availability during failover events accrue when the invention is deployed in a cluster of nodes.

Specifically, cluster implementation is most well-adapted to the transfer of the common virtual address between different master key managers during failover. This process not only ensures uninterrupted availability of encrypted cryptographic keys during failover, but it is also similar to the handling of general failover between a master node in charge of the cluster and its backup master node candidates. Therefore, in some embodiments the set of machines including the master key manager and the master key manager candidates is assigned to nodes of the cluster that correspond to the cluster's master node and its backup nodes.

In view of the above teaching, a person skilled in the art will recognize that the invention can be embodied in many different ways in addition to those described without departing from the spirit of the invention. Therefore, the scope of the invention should be judged in view of the appended claims and their legal equivalents.

I claim:

1. A computer system operating a shared file system that ensures high availability of cryptographic keys, said computer system comprising:
   a) a primary hardware security module for generating said cryptographic keys and for generating a sharable master key for encrypting said cryptographic keys to generate encrypted cryptographic keys;
   b) a key database in said shared file system for storing said encrypted cryptographic keys;
   c) master key manager candidates each being issued said sharable master key;
   d) a master key manager elected from among said master key manager candidates, said master key manager being assigned a common virtual address; whereby
   upon failover said common virtual address is transferred to a new master key manager elected from among said master key manager candidates thereby ensuring uninterrupted availability of said encrypted cryptographic keys during said failover.

2. The computer system of claim 1, wherein said computer system has a cluster comprising a plurality of nodes operating said shared file system.

3. The computer system of claim 2, wherein said master key manager and said master key manager candidates are designated among said plurality of nodes.

4. The computer system of claim 1, further comprising:
   a) a master message authentication code key issued to said master key manager at to each of said master key manager candidates;
   b) a message authentication code module for generating message authentication tags by applying said master message authentication code key over each of said encrypted cryptographic keys, whereby said message authentication tags are stored along with corresponding encrypted cryptographic keys in said key database.

5. The computer system of claim 4, wherein said message authentication code module uses said message authentication tags for confirming the integrity of corresponding encrypted cryptographic keys.

6. The computer system of claim 1, further comprising hardware security modules in each one of said master key manager candidates for storing said shareable master key.

7. The computer system of claim 1, wherein said shared file system is a distributed file system selected from the group consisting of Hadoop Distributed File System (HDFS), NFS, SMB, DRBD, XtremeFS, legato, Veritas, GFS, Fusion, GPFS, Ceph, Coda, Solaris ZFS.

8. The computer system of claim 1, further comprising file units, said file units being assigned to corresponding encrypted cryptographic keys.

9. The computer system of claim 8, wherein said file units comprise blocks in storage resources belonging to said computer system.

* * * * *